(12) United States Patent
Haberer et al.

(10) Patent No.: US 9,243,584 B2
(45) Date of Patent: Jan. 26, 2016

(54) CYLINDER HEAD GASKET WITH COMPRESSION CONTROL FEATURES

(71) Applicant: Federal Mogul Corporation, Southfield, MI (US)

(72) Inventors: Tyler Haberer, Southfield, MI (US); Takashi Okano, Commerce Township, MI (US); Daniel J. Vialard, Canton, MI (US)

(73) Assignee: Federal-Mogul Corporation, Southfield, MI (US)

( * ) Notice: Subject to any disclaimer, the term of this patent is extended or adjusted under 35 U.S.C. 154(b) by 38 days.

(21) Appl. No.: 14/179,934

(22) Filed: Feb. 13, 2014

(65) Prior Publication Data

US 2015/0226152 A1 Aug. 13, 2015

(51) Int. Cl.
*F16J 15/08* (2006.01)
*F02F 11/00* (2006.01)

(52) U.S. Cl.
CPC ........... *F02F 11/002* (2013.01); *F16J 15/0825* (2013.01); *F16J 2015/085* (2013.01); *F16J 2015/0862* (2013.01); *F16J 2015/0875* (2013.01)

(58) Field of Classification Search
CPC ....... F16J 15/08; F16J 15/0818; F16J 15/085; F02F 11/002
See application file for complete search history.

(56) References Cited

U.S. PATENT DOCUMENTS

| 5,618,049 | A | 4/1997 | Ueta |
| 5,713,580 | A | 2/1998 | Ueta |
| 5,938,208 | A * | 8/1999 | Yoshida et al. ............... 277/592 |
| 6,386,549 | B1 | 5/2002 | Johnson |
| 6,554,286 | B1 | 4/2003 | Tanaka |
| 6,746,021 | B2 | 6/2004 | Breen |
| 7,815,197 | B2 | 10/2010 | Ueta |
| 7,909,337 | B2 | 3/2011 | Ueta et al. |
| 8,011,674 | B2 | 9/2011 | Imai |
| 8,246,054 | B2 | 8/2012 | Schmitt et al. |
| 8,695,986 | B2 * | 4/2014 | Clemons et al. ............... 277/592 |
| 2003/0006565 | A1 * | 1/2003 | Inamura et al. ............... 277/592 |
| 2003/0042689 | A1 | 3/2003 | Diez et al. |
| 2003/0127805 | A1 | 7/2003 | Stapel |

(Continued)

FOREIGN PATENT DOCUMENTS

| DE | 29812037 U1 | 9/1998 |
| DE | 10060872 A1 | 1/2002 |

(Continued)

OTHER PUBLICATIONS

International Search Report, mailed May 21, 2015 (PCT/US2015/015198).

(Continued)

*Primary Examiner* — Gilbert Lee
(74) *Attorney, Agent, or Firm* — Robert L. Stearns; Dickinson Wright, PLLC (57) ABSTRACT

A cylinder head gasket including a first functional layer, a second functional layer, a first stopper, and a second stopper is provided. The first functional layer includes a first full bead extending around a combustion chamber opening and axially aligned with a second full bead of the second functional layer. The first stopper extends along the first functional layer between the combustion chamber opening and the first full bead for preventing over-compression of the first full bead. The second stopper extends along the second full bead of the second functional layer for increasing load on the second full bead, reducing head lift, and promoting an even distribution of the load. The second stopper includes a third full bead matching the second full bead of said second functional layer.

21 Claims, 4 Drawing Sheets

(56) References Cited

U.S. PATENT DOCUMENTS

2009/0166985 A1*  7/2009  Hohe et al. .................... 277/592
2009/0200752 A1   8/2009  Okano
2012/0193877 A1   8/2012  Okano et al.

FOREIGN PATENT DOCUMENTS

| | | |
|---|---|---|
| EP | 1777442 A1 | 4/2007 |
| JP | H0477592 A | 3/1992 |
| JP | 06-026575 | 4/1994 |
| JP | 06-229477 | 8/1994 |
| JP | 2010090945 A | 4/2010 |

OTHER PUBLICATIONS

International Search Report, mailed May 21, 2015 (PCT/US2015/015177).

* cited by examiner

CYLINDER HEAD GASKET WITH COMPRESSION CONTROL FEATURES

BACKGROUND OF THE INVENTION

1. Field of the Invention

This invention relates generally to gaskets for providing a seal between two parts, and more particularly to multi-layer gaskets, such as cylinder head gaskets.

2. Related Art

Gaskets are typically used to establish a gas and fluid tight seal between two parts clamped together, such as a cylinder head and an engine block of an internal combustion engine. Such gaskets oftentimes include a functional layer having a sealing bead, also referred to as an embossment, to facilitate the tight seal. The functional layer with the sealing bead is typically provided along with one or more additional layers, and the multiple layers are compressed together between the two clamped parts, in order to establish the gas and fluid tight seal. However, if the gasket is over-compressed, damage can occur to the sealing bead. For example, if the bead becomes substantially flattened, it loses its ability to exert a high compression sealing pressure, and fatigue cracks can form in the area of the bead.

SUMMARY OF THE INVENTION

One aspect of the invention provides a gasket, such as a cylinder head gasket of an internal combustion engine. The gasket includes a first functional layer extending between a first edge and a second edge, wherein the first edge surrounds a combustion chamber opening. A first full bead is provided in the first functional layer and extends around the combustion chamber opening. The gasket also includes a second functional layer extending between a third edge also surrounding the combustion chamber opening and a fourth edge. The second functional layer includes a second full bead axially aligned with the first full bead.

The gasket further includes a first stopper for preventing over-compression of the first full bead and a second stopper for increasing load on the second full bead, promoting an even distribution of the load, and reducing head lift. The first stopper extends along the first functional layer between the first edge and the first full bead. The second stopper extends along the second full bead of the second functional layer. The second stopper also includes a third full bead having a contour matching the contour of the second full bead of the second functional layer. The combination of the layers, beads, and stoppers of the gasket provide improved performance under high loads and motion, compared to prior art gasket designs.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Referring to the Figures, wherein like numerals indicate corresponding parts throughout the several views, a multi-layer static gasket 20, 20' is generally shown in FIGS. 1-4. The gasket 20, 20' is typically used to establish a gas and/or fluid-tight seal between two components clamped together, such as a cylinder head and engine block of an internal combustion engine of a vehicle. The gasket 20, 20' includes a first functional layer 22, 22' extending between a first edge 24, 24' and a second edge 26, 26', and a second functional layer 28, 28' extending between a third edge 30, 30' and a fourth edge 32, 32'. The first edge 24, 24' of the first functional layer 22, 22' and the third edge 30, 30' of the second functional layer 28, 28' surround a combustion chamber opening 34, 34'. The first functional layer 22, 22' includes a first full bead 36, 36' extending around the combustion chamber opening 34, 34', and the second functional layer 28, 28' includes a second full bead 38, 38' axially aligned with the first full bead 36, 36'. A first stopper 40, 40' extends along the first functional layer 22, 22' between the first edge 24, 24' and the first full bead 36, 36' for preventing over-compression of the first full bead 36, 36'. A second stopper 42, 42' extends along the second full bead 38, 38' of the second functional layer 28, 28' for increasing load on the second full bead 38, 38', promoting an even distribution of the load, and reducing head lift. The second stopper 42, 42' includes a third full bead 44, 44' having a contour matching the contour of the second full bead 38, 38' of the second functional layer 28, 28'.

Figure 1:
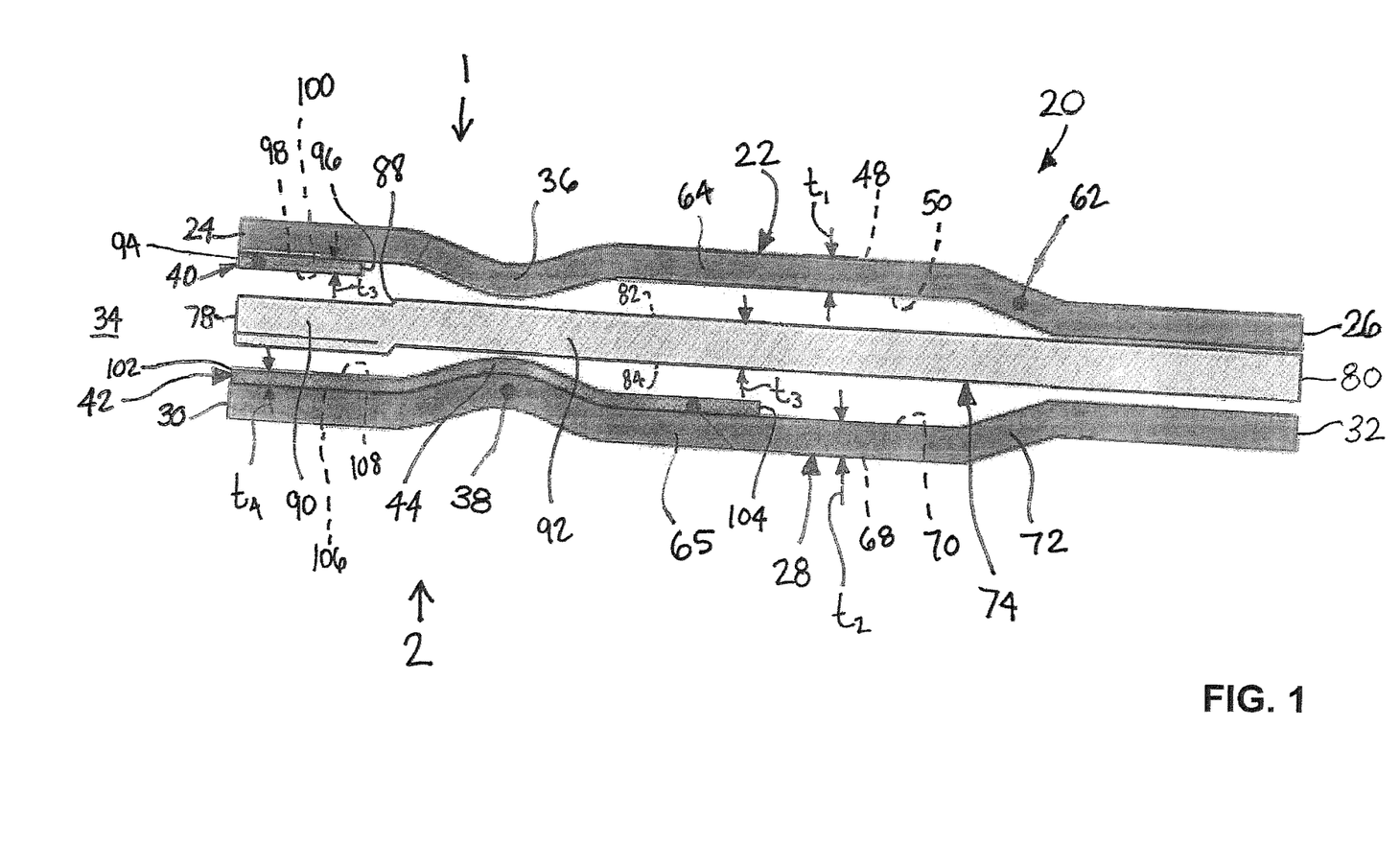
FIG. 1 is a radial cross-sectional side view of a cylinder head gasket according to a first exemplary embodiment of the invention.

FIG. 1 is a cross-sectional view of the gasket 20 according to a first exemplary embodiment. The first functional layer 22 of the gasket 20 extends continuously between the first edge 24 presenting the combustion chamber opening 34 and the second edge 26. The second edge 26 of the first functional layer 22 presents an outer periphery or a second opening for allowing fluid or bolts to pass therethrough. The first functional layer 22 also presents a first outer surface 48 and an oppositely facing first inner surface 50 each extending from the first edge 24 to the second edge 26. The first outer surface 48 and the first inner surface 50 present a thickness $t_1$ therebetween. The thickness $t_1$ is typically constant from the first edge 24 to the second edge 26. However, in alternate embodiments, the thickness $t_1$ can vary.

Figure 4:
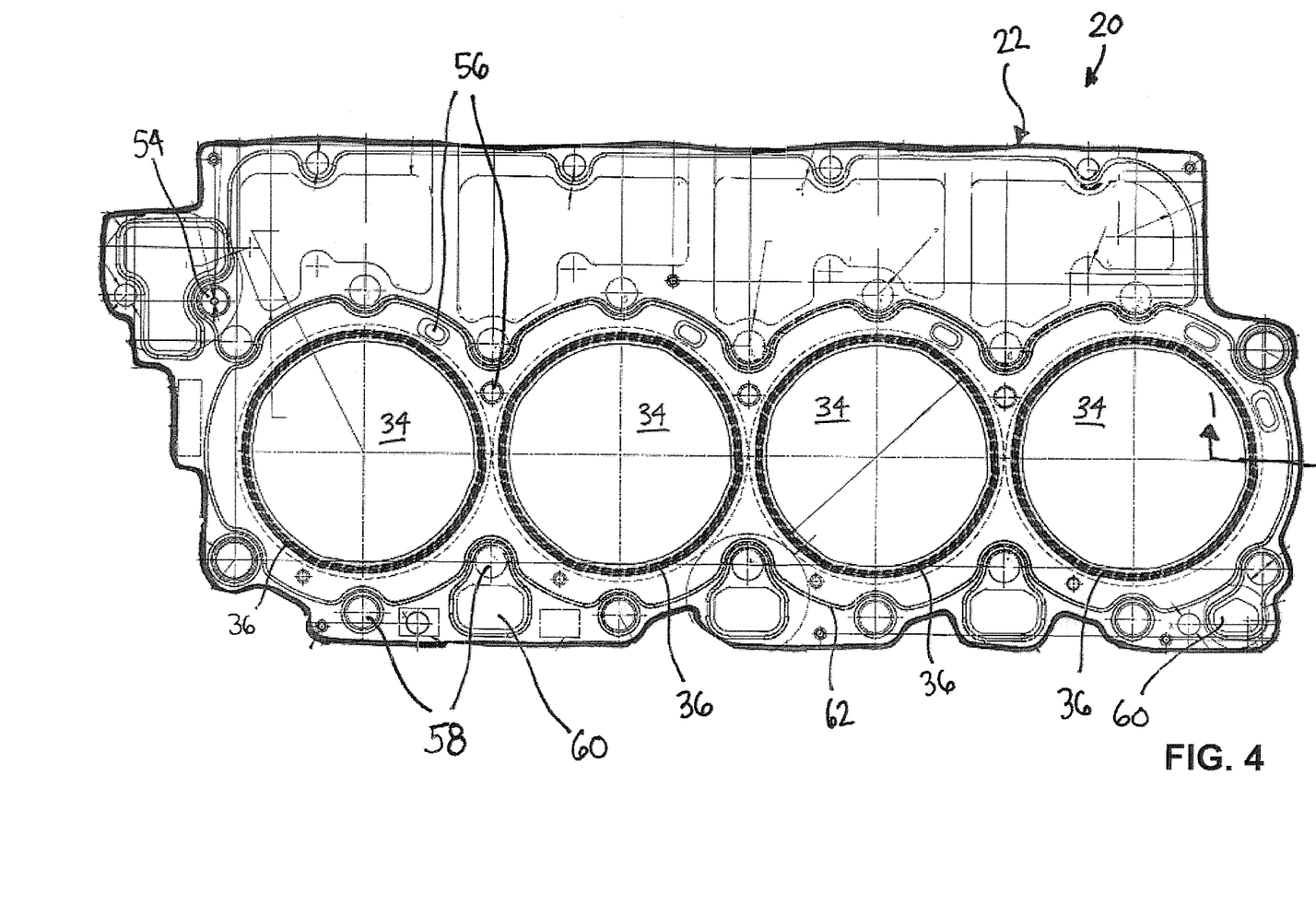
FIG. 4 is a top view of the exemplary cylinder head gasket of FIG. 1, wherein the cross-section shown in FIG. 1 is taken along line 1-1 of FIG. 4.

The gasket 20 typically includes multiple combustion chamber openings 34, each surrounded by the full beads 36, 38, 44. FIG. 4 is a top view of the exemplary gasket 20 of FIG. 1 showing four combustion chamber openings 34 each having a cylindrical shape. However, the gasket 20 could include any number of combustion chamber openings 34, depending on the engine for which the gasket 20 is designed, and those openings 34 could comprise another shape. The exemplary gasket 20 of FIG. 4 also includes other types of openings, in addition to the combustion chamber opening 34, such as oil feed holes 54, coolant metering holes 56, bolt holes 58, and oil drain back holes 60.

The first functional layer 22 of the exemplary gasket of FIG. 1 presents the first full bead 36 disposed between the first edge 24 and the second edge 26. This first full bead 36 is closer to the first edge 24 than the second edge 26, and it extends circumferentially and continuously around the first edge 24. The first inner surface 50 and the first outer surface 48 of the first functional layer 22 extend inwardly in a first direction 1, which is toward the second functional layer 28, to present the first full bead 36. As shown in FIG. 1, the first inner surface 50 of the first functional layer 22 is convex along the first full bead 36, and the first outer surface 48 of the first functional layer 22 is concave along the first full bead 36. The first inner surface 50 and the first outer surface 48 of the first functional layer 22 are typically planar between the first edge 24 and the first full bead 36.

The first functional layer 22 also includes a first half bead 62 disposed between the first full bead 36 and the second edge 26. The first half bead 62 typically extends along the second edge 26, and it may extend circumferentially and continuously around one of the secondary openings. The first inner surface 50 and the first outer surface 48 of the first functional layer 22 are typically planar in a region 64 between the first full bead 36 and the first half bead 62, and the first half bead 62 is formed by disposing a portion of the first inner surface 50 and the first outer surface 48 of the first functional layer 22 at an angle relative to the planar region 64. The first inner surface 50 and the first outer surface 48 of the first functional layer 22 extend in the first direction 1 to present the first half bead 62, which is the same direction as the first full bead 36. Between the first angled portion of the first half bead 62 and the second edge 26, the first inner surface 50 and the first outer surface 48 of the first functional layer 22 are planar.

The exemplary gasket 20 of FIG. 1 also includes the second functional layer 28 extending continuously between the third edge 30 aligned with the first edge 24 and the fourth edge 32 aligned with the second edge 26. The third edge 30 presents the combustion chamber opening 34, just like the first edge 24. The second functional layer 28 presents a second outer surface 68 and an oppositely facing second inner surface 70 each extending from the third edge 30 to the fourth edge 32. The second outer surface 68 and the second inner surface 70 present a thickness $t_2$ therebetween, and the thickness $t_2$ is typically constant from the third edge 30 to the fourth edge 32. In the exemplary embodiment, the thickness $t_2$ of the second functional layer 28 is equal to the thickness $t_1$ of the first functional layer 22.

The second functional layer 28 presents the second full bead 38 which is axially aligned with the first full bead 36 of the first functional layer 22 and extends circumferentially and continuously around the third edge 30 of the second functional layer 28. The second inner surface 70 and the second outer surface 68 of the second functional layer 28 extend inwardly in a second direction 2, which is opposite the first direction 1 and thus toward the first functional layer 22, to present the second full bead 38. The second full bead 38 is disposed between the third edge 30 and the fourth edge 32 of the second functional layer 28, and closer to the third edge 30 than the fourth edge 32. The second inner surface 70 of the second functional layer 28 is convex along the second full bead 38 and the second outer surface 68 of the second functional layer 28 is concave along the second full bead 38. The second inner surface 70 and the second outer surface 68 of the second functional layer 28 are typically planar between the third edge 30 and the second full bead 38.

The second functional layer 28 also includes a second half bead 72 axially aligned with and extending toward the first half bead 62. The second half bead 72 is disposed between the second full bead 38 and the fourth edge 32 of the second functional layer 28. The second half bead 72 typically extends along the fourth edge 32, and it may extend circumferentially and continuously around one of the secondary openings, just like the first half bead 62. The second inner surface 70 and the second outer surface 68 of the second functional layer 28 are planar in a region 65 between the second full bead 38 and the second half bead 72, and portion of the second inner surface 70 and the second outer surface 68 of the second functional layer 28 is disposed at an angle relative to the planar region 65 to present the second half bead 72. The second inner surface 70 and the second outer surface 68 of the second functional layer 28 extend in the second direction 2 to present the second half bead 72. Between the second angled portion and the fourth edge 32, the second inner surface 70 and the second outer surface 68 of the second functional layer 28 are planar.

The gasket 20 according to the exemplary embodiment of FIG. 1 also includes a distance layer 74 disposed between the first functional layer 22 and the second functional layer 28. The distance layer 74 is not required, but may be present to provide additional support, prevent over-compression, or adjust the distribution of the load along the gasket 20. The distance layer 74 extends continuously between a fifth edge 78 aligned with the first edge 24 and a sixth edge 80 aligned with the second edge 26, and the distance layer 74 presents a first surface 82 and an oppositely facing second surface 84 each extending from the fifth edge 78 to the sixth edge 80. The first surface 82 and the second surface 84 of the distance layer 74 present a thickness $t_3$ therebetween. In the exemplary embodiment, the thickness $t_3$ of the distance layer 74 is greater than the thickness $t_1$, $t_2$ of the functional layers 22, 28 and is generally constant from the fifth edge 78 to the sixth edge 80.

In the exemplary embodiment of FIG. 1, the distance layer 74 includes a stepped region 88 located radially between the full beads 36, 38, 44 and the fifth edge 78. The first surface 82 and the second surface 84 of the distance layer 74 are planar in a region between the fifth edge 78 and the stepped region 88 and planar in a region between the stepped region 88 and the sixth edge 80. The stepped region 88 is formed by disposing a portion of the first surface 82 and the second surface 84 of the distance layer 74 at an angle relative to the planar regions 64, 65. The distance layer 74 is typically extended or bent in the first direction 1 or the second direction 2 to present the stepped region 88. As shown in FIG. 1, a first portion 90 of the first surface 82 of the distance layer 74 located between the fifth edge 78 and the stepped region 88 is farther from the first functional layer 22 than a second portion 92 of the distance layer 74 located between the stepped region 88 and the sixth edge 80.

The gasket 20 of the exemplary embodiment of FIG. 1 also includes the first stopper 40 extending along the first inner surface 50 of the first functional layer 22, circumferentially around the first edge 24, and between the first edge 24 and the first full bead 36 for preventing over-compression of the first full bead 36. The first stopper 40 typically extends from a first stopper end 94 located at the first edge 24 to a second stopper end 96 located between the first edge 24 and the first full bead 36. However, the length of the first stopper 40 can vary. The first stopper 40 presents a first stopper surface 98 extending along the first inner surface 50 of the first functional layer 22 and a second stopper surface 100 facing opposite the first stopper surface 98 and toward the distance layer 74. The first stopper surface 98 and the second stopper surface 100 present a thickness $t_3$ therebetween, which is less than the thickness $t_1$, $t_2$ of the functional layers 22, 28. However, the thicknesses $t_3$ of the first stopper 40 can vary. The first stopper surface 98 is typically attached to the first inner surface 50 of the first functional layer 22 continuously from the first stopper end 94 to the second stopper end 96. The first stopper 40 can be attached to the first functional layer 22 by welding, such as laser welding, or by other methods. The first stopper 40 could alternatively be mechanically fixed to the first functional layer 22.

The gasket 20 of the exemplary embodiment of FIG. 1 also includes the second stopper 42 formed with the second full bead 38 of the second functional layer 28. The second stopper 42 increases the load on the second full bead 38, reduces head lift, and promotes an even distribution of the load when the gasket 20 is compressed between two parts. The second stopper 42 extends along the second inner surface 70 of the second functional layer 28, along the second full bead 38, and between the third edge 30 and the fourth edge 32 of the second functional layer 28. In the exemplary embodiment of FIG. 1, the second stopper 42 extends from a third stopper end 102 aligned with the third edge 30 to a fourth stopper end 104 located between the third edge 30 and the fourth edge 32, and closer to the fourth edge 32 than the third edge 30. However, the length of the second stopper 42 can vary. The second stopper 42 presents a third stopper surface 106 extending along the second inner surface 70 of the second functional layer 28 and a fourth stopper surface 108 facing opposite the first stopper surface 98 and toward the distance layer 74. The third stopper surface 106 and the fourth stopper surface 108 present a thickness $t_4$ therebetween, which in the exemplary embodiment is less than the thicknesses $t_1$, $t_2$ of the functional layers 22, 28. The thickness $t_4$ of the second stopper 42 could be equal to, greater than, or less than the thickness $t_3$ of the first stopper 40. Typically, the thickness $t_4$ of the second stopper 42 is not less than the thickness $t_3$ of the first stopper 40. The third stopper surface 106 is typically attached to the second functional layer 28 continuously from the third stopper end 102 to the fourth stopper end 104. In the exemplary embodiment, the third stopper surface 106 is welded to the second inner surface 70 of the second functional layer 28, but the second stopper 42 could be attached to the second functional layer 28 using other methods. For example, the second stopper 42 could be mechanically fixed to the second functional layer 28.

As shown in the Figures, the second stopper 42 presents the third full bead 44 between the third stopper end 102 and the fourth stopper end 104. The third full bead 44 and the second full bead 38 are typically formed together, after attaching the second stopper 42 to the second functional layer 28, and thus have matching contours or profiles. Alternatively, the second full bead 38 in the second functional layer 28 and the third full bead 44 in the second stopper 42 could be formed separately before attaching the second stopper 42 and the second functional layer 28 together, but the second full bead 38 and the third full bead 44 would still have matching contours. The third stopper surface 106 is concave along the third full bead 44 and the fourth stopper surface 108 is convex along the third full bead 44.

Each of the layers 22, 28, 74 and the stoppers 40, 42 of the gasket 20 are typically formed of a steel material, such as a steel material including chromium and nickel. Exemplary materials include SS301 fully hardened spring stainless steel material, cold rolled stainless steel, or SS304 annealed stainless steel. Alternatively, the layers 22, 28, 74 and stoppers 40, 42 of the gasket 20 could be formed of another metal or non-metal material.

The gasket 20 can include multiple sets of the functional layers 22, 28 and stoppers 40, 42 shown in FIG. 1. For example, the gasket 20 can include multiple first functional layers 22 and corresponding first stoppers 40, and/or multiple second functional layers 28 and corresponding second stoppers 42. The gasket 20 can also include additional distance layers 74. Also, although not shown, the orientation of the layers 22, 28, 74 and stoppers 40, 42 of the gasket 20 of FIG. 1 could be reversed, such that the second functional layer 28 is disposed above the first functional layer 28.

Figure 2:
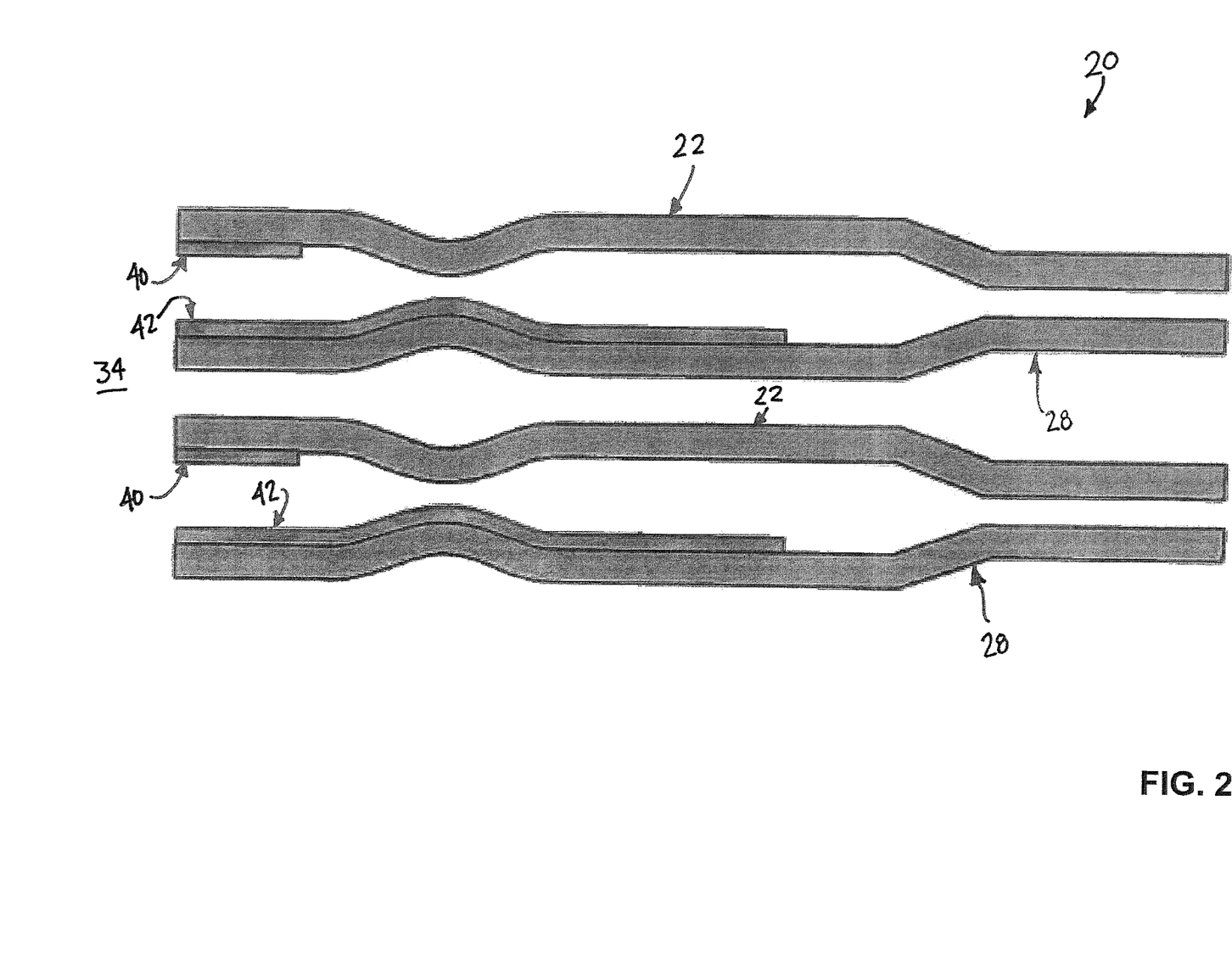
FIG. 2 is a radial cross-sectional side view of the cylinder head gasket according to a second exemplary embodiment of the invention.

A second exemplary cylinder head gasket 20 is shown in the cross-sectional view of FIG. 2. In this embodiment, the gasket 20 includes two sets of the functional layers 22, 28 stacked one on top of the other. Unlike the gasket 20 of the first exemplary embodiment, this gasket 20 does not include any distance layer 74. As in FIG. 1, the orientation of the layers 22, 28 and stoppers 40, 42 of the gasket 20 of FIG. 2 could be reversed.

Figure 3:
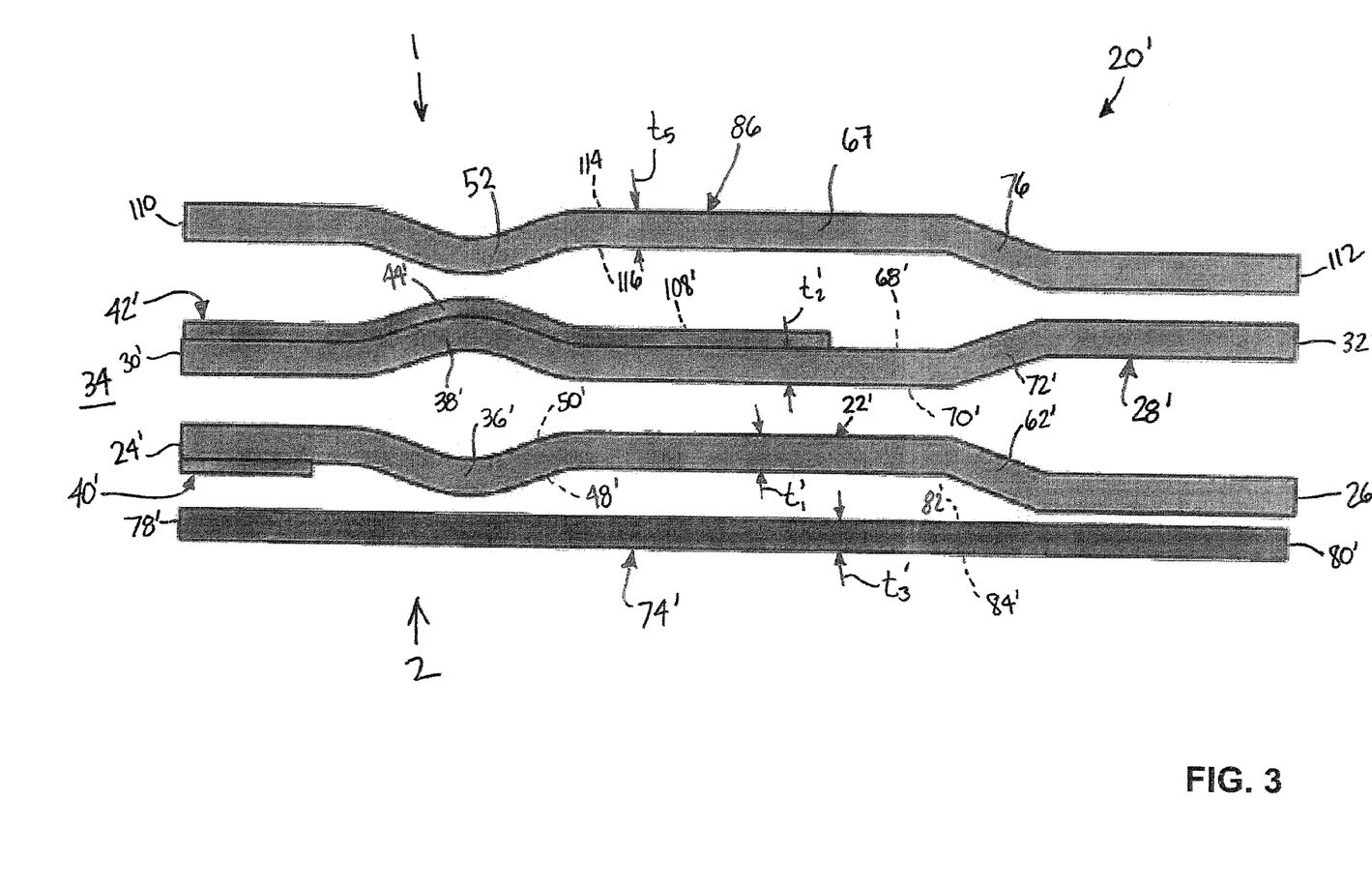
FIG. 3 is a radial cross-sectional side view of the cylinder head gasket according to a third exemplary embodiment of the invention.

A third exemplary embodiment of the gasket 20' is shown in FIG. 3, also in cross-section. This gasket 20' includes the first functional layer 22' and the second functional layer 28', having the same design as the functional layers 22, 28 of FIGS. 1 and 2. However, in this case, the second functional layer 28' is disposed above the first functional layer 22'. Thus, the location of the first inner surface 50' and the first outer surface 48' of the first functional layer 22' are reversed, as well as the location of the second inner surface 70' and the second outer surface 68' of the second functional layer 28'. The first full bead 36' and the second full bead 38' extend outwardly away from one another, and the first half bead 62' and the second half bead 72' also extend outwardly away from one another. The first outer surface 48' of the first functional layer 22' is convex along the first full bead 36' and the first inner surface 50' of the first functional layer 22' is concave along the first full bead 36'; and the second outer surface 68' of the second functional layer 28' is convex along the second full bead 38' and the second inner surface 70' of the second functional layer 28' is concave along the second full bead 38'.

As shown in FIG. 3, the gasket 20' of the third exemplary embodiment also includes the distance layer 74' disposed adjacent the first outer surface 48' of the first functional layer 22' and extending continuously between the fifth edge 78' aligned with the first edge 24' and the sixth edge 80' aligned with the second edge 26'. However, in this embodiment, the thickness $t_3'$ of the distance layer 74' is less than the thickness $t_1'$, $t_2'$ of the functional layers 22', 28' and the first surface 82' and the second surface 84' of the distance layer 74' are planar from the fifth edge 78' to the sixth edge 80'.

The gasket 20' of the third exemplary embodiment also includes the first stopper 40' and the second stopper 42'. The first stopper 40' extends along the first outer surface 48' of the first functional layer 22' between the first edge 24' and the first full bead 36' for preventing over-compression of the first full bead 36', and the second stopper 42 extends along the second outer surface 68' of the second full bead 38' of the second functional layer 28' between the third edge 30' and the fourth edge 32' for increasing load on the second full bead 38', reducing head lift, and promoting even distribution of the load. The second stopper 42' is typically formed with the second functional layer 28', but may be formed separate from the second functional layer 28', as discussed above.

In the exemplary embodiment of FIG. 3, the gasket 20' also includes a third functional layer 86 disposed adjacent the fourth stopper surface 108' and the second outer surface 68' of the second functional layer 28'. The third functional layer 86 and the first functional layer 22' have matching contours, but no stopper is disposed along the third functional layer 86.

The third functional layer 86 extends continuously between a seventh edge 110 aligned with the first edge 24' and an eighth edge 112 aligned with the second edge 26'. The third functional layer 86 also presents an third outer surface 114 and an oppositely facing third inner surface 116 each extending from the seventh edge 110 to the eighth edge 112. The third outer surface 114 and the third inner surface 116 present a thickness $t_5$ therebetween, and the thickness $t_5$ is constant from the seventh edge 110 to the eighth edge 112. In the exemplary embodiment, the thickness $t_5$ of the third functional layer 86 is equal to the thickness $t_1'$ of the first functional layer 22 and the thickness $t_2'$ of the second functional layer 28'.

The third functional layer 86 presents a fourth full bead 52 axially aligned with the other full beads 36', 38', 44' of the gasket 20, as shown in FIG. 3. The fourth full bead 52 is disposed between the seventh edge 110 and the eighth edge 112, but is closer to the seventh edge 110 than the eighth edge 112. The third inner surface 116 and the third outer surface 114 of the third functional layer 86 extend in the first direction 1, which is inwardly toward the second functional layer 28', to present the fourth full bead 52. The third inner surface 116 of the third functional layer 86 is convex along the fourth full bead 52 and the third outer surface 114 of the third functional layer 86 is concave along the fourth full bead 52. Like the other full beads 36', 38', 44', the fourth full bead 52 extends circumferentially and continuously around the combustion chamber opening 34'. The third inner surface 116 and the third outer surface 114 of the third functional layer 86 are typically planar between the seventh edge 110 and the fourth full bead 52.

The third functional layer 86 also includes a third half bead 76 axially aligned with the first half bead 62' and the second half bead 72'. The third half bead 76 is disposed between the fourth full bead 52 and the eighth edge 112. The third half bead 76 typically extends along the eighth edge 112, just like the other half beads 62', 72'. The third inner surface 116 and the third outer surface 114 of the third functional layer 86 are planar in a region 67 between the fourth full bead 52 and the third half bead 76. The third half bead 76 is typically formed by disposing a portion of the third inner surface 116 and the third outer surface 114 of the third functional layer 86 at an angle relative to the planar region 67. For example, the third functional layer 86 can be bent in the first direction 1 or the second direction 2 to present the third half bead 76. The third inner surface 116 and the third outer surface 114 of the third functional layer 86 are planar between the third angled portion and the eighth edge 112.

Of course, the orientation of the layers 22', 28', 74', 86' and stoppers 40' 42' of the gasket 20' of FIG. 3 could be reversed, such that the first functional layer 22' is the uppermost layer. Obviously, many modifications and variations of the present invention are possible in light of the above teachings and may be practiced otherwise than as specifically described while within the scope of the appended claims.

What is claimed is:

1. A gasket, comprising:
   a first functional layer extending between a first edge surrounding a combustion chamber opening and a second edge, said first functional layer including a first full bead extending around said combustion chamber opening, and said first functional layer including a first half bead adjacent said second edge;
   a second functional layer extending between a third edge surrounding said combustion chamber opening and a fourth edge, said second functional layer including a second full bead axially aligned with said first full bead, said second functional layer including a second half bead axially aligned with said first half bead;
   a first stopper extending along said first functional layer from a first stopper end away from said combustion chamber opening to a second stopper end, wherein said second stopper end is located between said first edge and said first full bead;
   a second stopper extending along said second full bead of said second functional layer and including a third full bead; and
   said third full bead of second stopper and said second full bead of said second functional layer having matching contours.

2. The gasket of claim 1 wherein said first functional layer includes a first inner surface and said second functional layer includes a second inner surface facing said first inner surface, said first stopper extends along said first inner surface, said first stopper end is axially aligned with said first edge, and said first stopper extends circumferentially around said combustion chamber opening.

3. The gasket of claim 1 wherein said first functional layer includes a first inner surface and said second functional layer includes a second inner surface facing said first inner surface, said second stopper extends along said second inner surface from a third stopper end axially aligned with said third edge to a fourth stopper end located between said second full bead and said fourth edge, and said second stopper extends circumferentially around said combustion chamber opening.

4. The gasket of claim 1 wherein said stoppers and said functional layers each present a thickness, and said thickness of said stoppers is less than said thickness of said functional layers.

5. The gasket of claim 1 wherein said first full bead and said second full bead extend inwardly toward one another.

6. The gasket of claim 1 wherein said half beads extend inwardly toward one another.

7. The gasket of claim 1 wherein said stoppers are welded or mechanically fixed to said functional layers.

8. The gasket of claim 1 including a distance layer disposed between said first functional layer and said second functional layer.

9. The gasket of claim 8 wherein said distance layer extends from a fifth edge axially aligned with said first edge and a sixth edge axially aligned with said second edge of said first functional layer, and said distance layer includes a stepped region located radially between said fifth edge and said full beads of said functional layers.

10. The gasket of claim 9 wherein said distance layer presents a first surface and an oppositely facing second surface, said first surface and said second surface of said distance layer are planar in a region between said fifth edge and said stepped region and planar in a region between said stepped region and said sixth edge,
    a portion of said first surface and said second surface of said distance layer are disposed at an angle relative to said planar regions and extend toward said first functional layer to present said stepped region, and said stepped region extends linearly between said planar regions.

11. The gasket of claim 1 wherein said first functional layer includes a first outer surface and said second functional layer includes a second outer surface facing opposite said first outer surface, said first stopper extends along said first outer surface, said first stopper end is axially aligned with said first edge, and said first stopper extends circumferentially around said combustion chamber opening.

12. The gasket of claim 1 wherein said first functional layer includes a first outer surface and said second functional layer includes a second outer surface facing opposite said first outer surface, said second stopper extends along said second outer surface from a third stopper end axially aligned with said third edge to a fourth stopper end located between said second full bead and said fourth edge, and said second stopper extends circumferentially around said combustion chamber.

13. The gasket of claim 1 wherein said first full bead and said second full bead extend outwardly away from one another.

14. The gasket of claim 1 wherein said half beads extend outwardly away from one another.

15. The gasket of claim 1 including a distance layer disposed adjacent said first outer surface of said first functional layer.

16. The gasket of claim 15 wherein said distance layer extends from a fifth edge aligned with said first edge and a sixth edge aligned with said second edge of said first functional layer, and said distance layer is planar between said fifth edge and said sixth edge.

17. The gasket of claim 1 including a plurality of said first functional layers and a plurality of said second functional layers and a plurality of said stoppers.

18. The gasket of claim 1 wherein said first stopper end is axially aligned with said first edge of said first functional layer;
said second stopper extends from a third stopper end axially aligned with said third edge of said second functional layer to a fourth stopper edge located between said third edge and said fourth edge of said second functional layer;
said first functional layer includes a half bead adjacent said second edge;
said second functional layer includes a half bead adjacent said fourth edge; and
said half beads are axially aligned with one another.

19. A gasket, comprising:
a first functional layer extending between a first edge surrounding a combustion chamber opening and a second edge, said first functional layer including a first full bead extending around said combustion chamber opening;
a second functional layer extending between a third edge surrounding said combustion chamber opening and a fourth edge, said second functional layer including a second full bead axially aligned with said first full bead;
a first stopper extending said first functional layer between said first edge and said first full bead;
a second stopper extending along said second full bead of said second functional layer and including a third full bead;
said third full bead of second stopper and said second full bead of said second functional layer having matching contours;
a distance layer disposed adjacent said first outer surface of said first functional layer, said distance layer extending from a fifth edge aligned with said first edge and a sixth edge aligned with said second edge of said first functional layer, and said distance layer being planar between said fifth edge and said sixth edge; and
a third functional layer disposed adjacent said second outer surface of said second functional layer, and said third functional layer and said first functional layer having matching contours.

20. A cylinder head gasket, comprising:
a first functional layer extending continuously between a first edge presenting a combustion chamber opening and a second edge, said combustion chamber opening having a cylindrical shape;
said first functional layer presenting an first outer surface and an oppositely facing first inner surface each extending from said first edge to said second edge;
said first outer surface and said first inner surface presenting a thickness therebetween, said thickness being constant from said first edge to said second edge;
said first functional layer presenting a first full bead disposed between said first edge and said second edge and closer to said first edge than said second edge;
said first inner surface and said first outer surface of said first functional layer extending inwardly in a first direction to present said first full bead;
said first inner surface of said first functional layer being convex along said first full bead and said first outer surface of said first functional layer being concave along said first full bead;
said first full bead extending circumferentially and continuously around said first edge presenting said combustion chamber opening;
said first inner surface and said first outer surface of said first functional layer being planar between said first edge and said first full bead;
said first functional layer including a first half bead disposed between said first full bead and said second edge;
said first half bead extending along said second edge;
said first inner surface and said first outer surface of said first functional layer being planar in a region between said first full bead and said first half bead;
a portion of said first inner surface and said first outer surface of said first functional layer being disposed at an angle relative to said planar region and extending in said first direction to present said first half bead;
said first inner surface and said first outer surface of said first functional layer being planar between said first angled portion and said second edge;
a second functional layer extending continuously between a third edge aligned with said first edge and presenting said combustion chamber opening and a fourth edge aligned with said second edge;
said second functional layer presenting a second outer surface and an oppositely facing second inner surface each extending from said third edge to said fourth edge;
said second outer surface and said second inner surface presenting a thickness therebetween, said thickness being constant from said third edge to said fourth edge;
said thickness of said second functional layer being equal to said thickness of said first functional layer;
said second functional layer presenting a second full bead disposed between said third edge and said fourth edge and closer to said third edge than said fourth edge;
said second inner surface and said second outer surface of said second functional layer extending inwardly in a second direction opposite said first direction to present said second full bead;
said second full bead of said second functional layer being axially aligned with said first full bead of said first functional layer;
said second inner surface of said second functional layer being convex along said second full bead and said second outer surface of said second functional layer being concave along said second full bead;
said second full bead of said second functional layer extending circumferentially and continuously around said third edge presenting said combustion chamber opening;
said second inner surface and said second outer surface of said second functional layer being planar between said third edge and said second full bead;
said second functional layer including a second half bead disposed between said second full bead and said fourth edge and axially aligned with said first half bead;
said second half bead extending along said fourth edge;
said second inner surface and said second outer surface of said second functional layer being planar in a region between said second full bead and said second half bead;

a portion of said second inner surface and said second outer surface of said second functional layer being disposed at an angle relative to said planar region and extending in said second direction to present said second half bead;
said second inner surface and said second outer surface of said second functional layer being planar between said second angled portion and said fourth edge;
a distance layer disposed between said first functional layer and said second functional layer;
said distance layer extending continuously between a fifth edge aligned with said first edge and presenting said combustion chamber opening and a sixth edge aligned with said second edge;
said distance layer presenting a first surface and an oppositely facing second surface each extending from said fifth edge to said sixth edge;
said first surface and said second surface presenting a thickness therebetween, said thickness being constant from said fifth edge to said sixth edge;
said thickness of said distance layer being greater than said thickness of said functional layers;
said distance layer including a stepped region located radially between said full beads and said fifth edge;
first surface and said second surface of said distance layer being planar in a region between said fifth edge and said stepped region and planar in a region between said stepped region and said sixth edge;
a portion of said first surface and said second surface of said distance layer being disposed at an angle relative to said planar regions to present said stepped region;
a first portion of said first surface of said distance layer located between said fifth edge and said stepped region being farther from said first functional layer than a second portion of said distance layer located between said stepped region and said sixth edge;
a first stopper extending along said first inner surface of said first functional layer circumferentially around said first edge and between said first edge and said first full bead for preventing over-compression of said first full bead;
said first stopper extending from a first stopper end located at said first edge to a second stopper end located between said first edge and said first full bead;
said first stopper presenting a first stopper surface extending along said first inner surface of said first functional layer and a second stopper surface facing opposite said first stopper surface and toward said distance layer;
said first stopper surface being welded to said first inner surface of said first functional layer;
said first stopper surface and said second stopper surface presenting a thickness therebetween;
said thickness of said first stopper being less than said thickness of said functional layers;
a second stopper extending along said second inner surface of said second full bead of said second functional layer between said third edge and said fourth edge for increasing load on said second full bead and promoting even distribution of the load;
said second stopper extending from a third stopper end aligned with said third edge to a fourth stopper end located between said third edge and said fourth edge and closer to said fourth edge than said third edge;
said second stopper presenting a third stopper surface extending along said second inner surface of said second functional layer and a fourth stopper surface facing opposite said first stopper surface and toward said distance layer;
said third stopper surface being welded to said second inner surface of said second functional layer;
said third stopper surface and said fourth stopper surface presenting a thickness therebetween;
said thickness of said second stopper being not less than said thickness of said first stopper and less than said thickness of said functional layers;
said second stopper presenting a third full bead between said third stopper end and said fourth stopper end;
said third full bead and said second full bead having matching contours;
said third stopper surface being concave along said third full bead and said fourth stopper surface being convex along said third full bead;
each of said layers and said stoppers being formed of a steel material, said steel material including chromium and nickel.

21. A cylinder head gasket, comprising:
a first functional layer extending continuously between a first edge presenting a combustion chamber opening and a second edge;
said first functional layer presenting a first outer surface and an oppositely facing first inner surface each extending from said first edge to said second edge;
said first outer surface and said first inner surface presenting a thickness therebetween, said thickness being constant from said first edge to said second edge;
said first functional layer presenting a first full bead disposed between said first edge and said second edge and closer to said first edge than said second edge;
said first inner surface and said first outer surface of said first functional layer extending outwardly in a first direction to present said first full bead;
said first outer surface of said first functional layer being convex along said first full bead and said first inner surface of said first functional layer being concave along said first full bead;
said first full bead extending circumferentially and continuously around said combustion chamber opening;
said first inner surface and said first outer surface of said first functional layer being planar between said first edge and said first full bead;
said first functional layer including a first half bead disposed between said first full bead and said second edge;
said first half bead extending along said second edge;
said first inner surface and said first outer surface of said first functional layer being planar in a region between said first full bead and said first half bead;
a portion of said first inner surface and said first outer surface of said first functional layer being disposed at an angle relative to said planar region and extending in said first direction to present said first half bead;
said first inner surface and said first outer surface of said first functional layer being planar between said first angled portion and said second edge;
a second functional layer extending continuously between a third edge aligned with said first edge and presenting said combustion chamber opening and a fourth edge aligned with said second edge;
said second functional layer presenting a second outer surface and an oppositely facing second inner surface each extending from said third edge to said fourth edge;
said second outer surface and said second inner surface presenting a thickness therebetween, said thickness being constant from said third edge to said fourth edge;
said thickness of said second functional layer being equal to said thickness of said first functional layer;

said second functional layer presenting a second full bead disposed between said third edge and said fourth edge and closer to said third edge than said fourth edge;

said second inner surface and said second outer surface of said second functional layer extending outwardly in a second direction opposite said first direction to present said second full bead;

said second full bead of said second functional layer being axially aligned with said first full bead of said first functional layer;

said second outer surface of said second functional layer being convex along said second full bead and said second inner surface of said second functional layer being concave along said second full bead;

said second full bead of said second functional layer extending circumferentially and continuously around said combustion chamber opening;

said second inner surface and said second outer surface of said second functional layer being planar between said third edge and said second full bead;

said second functional layer including a second half bead disposed between said full bead and said fourth edge;

said second half bead extending along said fourth edge;

said second inner surface and said second outer surface of said second functional layer being planar in a region between said second full bead and said second half bead;

a portion of said second inner surface and said second outer surface of said second functional layer being disposed at an angle relative to said planar region and extending in said second direction to present said second half bead;

said second inner surface and said second outer surface of said second functional layer being planar between said second angled portion and said fourth edge;

a distance layer disposed adjacent said first outer surface of said first functional layer and extending continuously between a fifth edge aligned with said first edge and presenting said combustion chamber opening and a sixth edge aligned with said second edge;

said distance layer presenting a first surface and an oppositely facing second surface each extending from said fifth edge to said sixth edge;

said first surface and said second surface presenting a thickness therebetween, said thickness being constant from said fifth edge to said sixth edge;

said thickness of said distance layer being less than said thickness of said functional layers;

first surface and said second surface of said distance layer being planar from said fifth edge to said sixth edge;

a first stopper extending along said first outer surface of said first functional layer between said first edge and said first full bead for preventing over-compression of said first full bead;

said first stopper extending from a first stopper end located at said first edge to a second stopper end located between said first edge and said first full bead;

said first stopper presenting a first stopper surface extending along said first outer surface of said first functional layer and a second stopper surface facing opposite said first stopper surface and toward said distance layer;

said first stopper surface being welded to said first outer surface of said first functional layer;

said first stopper surface and said second stopper surface presenting a thickness therebetween;

said thickness of said first stopper being less than said thickness of said functional layers and less than said thickness of said distance layer;

a second stopper extending along said second outer surface of said second full bead of said second functional layer between said third edge and said fourth edge for increasing load on said second full bead and promoting even distribution of the load;

said second stopper extending from a third stopper end located at said third edge to a fourth stopper end located between said third edge and said fourth edge and closer to said fourth edge than said third edge;

said second stopper presenting a third stopper surface extending along said second outer surface of said second functional layer and a fourth stopper surface facing opposite said first stopper surface;

said third stopper surface being welded to said second outer surface of said second functional layer;

said third stopper surface and said fourth stopper surface presenting a thickness therebetween;

said thickness of said second stopper being not less than said thickness of said first stopper and less than said thickness of said functional layers and less than said thickness of said distance layer;

said second stopper presenting a third full bead between said third stopper end and said fourth stopper end;

said third full bead and said second full bead having matching contours;

said third stopper surface being concave along said third full bead and said fourth stopper surface being concave along said third full bead;

a third functional layer disposed adjacent said fourth stopper surface and said second outer surface of said second functional layer;

said third functional layer and said first functional layer having matching contours;

said third functional layer extending continuously between a seventh edge aligned with said first edge and a eighth edge aligned with said second edge;

said third functional layer presenting an third outer surface and an oppositely facing third inner surface each extending from said seventh edge to said eighth edge;

said third outer surface and said third inner surface presenting a thickness therebetween, said thickness being constant from said seventh edge to said eighth edge;

said thickness of said third functional layer being equal to said thickness of said first functional layer and said thickness of said second functional layer;

said third functional layer presenting a fourth full bead disposed between said seventh edge to said eighth edge and closer to said seventh edge than said eighth edge;

said third inner surface and said third outer surface of said third functional layer extending in said first direction to present said fourth full bead;

said third inner surface of said third functional layer being convex along said fourth full bead and said third outer surface of said third functional layer being concave along said fourth full bead;

said fourth full bead extending circumferentially and continuously around said combustion chamber opening;

said third inner surface and said third outer surface of said third functional layer being planar between said seventh edge and said fourth full bead;

said third functional layer including a third half bead disposed between said fourth full bead and said eighth edge and axially aligned with said first half bead and said second half bead;

said third half bead extending along said eighth edge;

said third inner surface and said third outer surface of said third functional layer being planar in a region between said fourth full bead and said third half bead;

a portion of said third inner surface and said third outer surface of said third functional layer being disposed at an angle relative to said planar region and extending in said first direction to present said third half bead;

said third inner surface and said third outer surface of said third functional layer being planar between said third angled portion and said eighth edge;

each of said layers and said stoppers being formed of a steel material, said steel material including chromium and nickel.

* * * * *